US007006250B2

(12) United States Patent
Denton et al.

(10) Patent No.: US 7,006,250 B2
(45) Date of Patent: Feb. 28, 2006

(54) METHOD OF SETTING LASER POWER AND DEVELOPER BIAS IN AN ELECTROPHOTOGRAPHIC MACHINE BASED ON AN ESTIMATED INTERMEDIATE BELT REFLECTIVITY

(75) Inventors: Gary Allen Denton, Lexington, KY (US); Stanley Coy Tungate, Jr., Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 889 days.

(21) Appl. No.: 09/965,264

(22) Filed: Sep. 27, 2001

(65) Prior Publication Data

US 2003/0058460 A1 Mar. 27, 2003

(51) Int. Cl.
*H04N 1/40* (2006.01)

(52) U.S. Cl. ........................ 358/1.9; 358/2.1; 358/296

(58) Field of Classification Search ................ 358/1.7, 358/1.9, 296–300, 2.1, 406, 504
See application file for complete search history.

(56) References Cited

U.S. PATENT DOCUMENTS

| | | | |
|---|---|---|---|
| 4,427,998 | A | 1/1984 | Huntoon |
| 4,605,970 | A | 8/1986 | Hawkins |
| 4,647,184 | A | 3/1987 | Russell et al. |
| 4,647,981 | A | 3/1987 | Froelich |
| 4,878,082 | A | 10/1989 | Matsushita et al. |
| 4,881,181 | A | 11/1989 | Jeschke et al. |
| 5,148,217 | A | 9/1992 | Almeter et al. |
| 5,148,289 | A | 9/1992 | Nishiyama et al. |
| 5,165,074 | A | 11/1992 | Melino |
| 5,170,267 | A | 12/1992 | Blitz et al. |
| 5,181,068 | A | 1/1993 | Morikawa |
| 5,227,842 | A | 7/1993 | Hayashi et al. |
| 5,250,988 | A | 10/1993 | Matsuura et al. |
| 5,253,084 | A | 10/1993 | Rylander |
| 5,282,053 | A | 1/1994 | Robideau |
| 5,291,310 | A | 3/1994 | Levien |
| 5,307,181 | A | 4/1994 | Levien |
| 5,315,351 | A | 5/1994 | Matsushiro et al. |
| 5,347,369 | A | 9/1994 | Harrington |
| 5,353,052 | A | 10/1994 | Suzuki et al. |
| 5,386,276 | A | 1/1995 | Swales et al. |
| 5,434,604 | A | 7/1995 | Cleary et al. |
| 5,461,462 | A | 10/1995 | Nakane et al. |
| 5,469,267 | A | 11/1995 | Wang |
| 5,486,901 | A | 1/1996 | Fukuchi et al. |
| 5,502,550 | A | 3/1996 | Hori et al. |
| 5,512,986 | A | 4/1996 | Toyomura et al. |
| 5,519,441 | A | 5/1996 | Gusmano et al. |
| 5,521,677 | A | 5/1996 | Brewington et al. |
| 5,526,140 | A | 6/1996 | Rozzi |
| 5,543,896 | A | 8/1996 | Mestha |
| 5,559,579 | A | 9/1996 | Gwaltney et al. |
| 5,568,234 | A | 10/1996 | Shiba |
| 5,572,330 | A | 11/1996 | Sasanuma |
| 5,574,544 | A | 11/1996 | Yoshino et al. |
| 5,598,272 | A | 1/1997 | Fisch et al. |
| 5,625,391 | A | 4/1997 | Hirabayashi et al. |

(Continued)

*Primary Examiner*—Thomas D. Lee
*Assistant Examiner*—Stephen Brinich
(74) *Attorney, Agent, or Firm*—John A. Brady

(57) ABSTRACT

A method of calibrating an electrophotographic machine having an image-bearing surface includes estimating a reflectivity of the image-bearing surface based upon an amount of usage of the electrophotographic machine. At least one electrophotographic condition is adjusted dependent upon the estimating step.

20 Claims, 3 Drawing Sheets

U.S. PATENT DOCUMENTS

| | | | |
|---|---|---|---|
| 5,636,330 | A | 6/1997 | Barak |
| 5,649,073 | A | 7/1997 | Knox et al. |
| 5,684,517 | A | 11/1997 | Clemente et al. |
| 5,694,223 | A | 12/1997 | Katori et al. |
| 5,710,958 | A | 1/1998 | Raj |
| 5,722,007 | A | 2/1998 | Ogata et al. |
| 5,748,330 | A | 5/1998 | Wang et al. |
| 5,748,857 | A | 5/1998 | Nakamura et al. |
| 5,784,667 | A | 7/1998 | Mestha et al. |
| 5,797,064 | A | 8/1998 | Raj et al. |
| 5,819,132 | A | 10/1998 | Hirobe |
| 5,826,079 | A | 10/1998 | Boland et al. |
| 5,831,642 | A | 11/1998 | Matsubara et al. |
| 5,854,882 | A | 12/1998 | Wang |
| 5,856,876 | A | 1/1999 | Sasanuma et al. |
| 5,873,011 | A | 2/1999 | Takemoto et al. |
| 5,895,141 | A | 4/1999 | Budnik et al. |
| 5,898,443 | A | 4/1999 | Yoshino et al. |
| 5,903,796 | A | 5/1999 | Budnik et al. |
| 5,926,617 | A | 7/1999 | Ohara et al. |
| 5,930,010 | A | 7/1999 | Cheung et al. |
| 5,933,680 | A | 8/1999 | Nishimura |
| 5,937,229 | A | 8/1999 | Walgrove et al. |
| 5,946,451 | A | 8/1999 | Soker |
| 5,953,554 | A | 9/1999 | Ohnishi et al. |
| 5,974,276 | A | 10/1999 | Oogi |
| 5,987,272 | A | 11/1999 | Maeda et al. |
| 5,995,248 | A | 11/1999 | Katori et al. |
| 6,000,776 | A | 12/1999 | Suzuki et al. |
| 6,003,980 | A | 12/1999 | Sheinman et al. |
| 6,008,907 | A | 12/1999 | Vigneau et al. |
| 6,035,103 | A | 3/2000 | Zuber |
| 6,064,848 | A | 5/2000 | Haneda |
| 6,076,915 | A | 6/2000 | Gast et al. |
| 6,078,401 | A | 6/2000 | Kanamori |
| 6,084,607 | A | 7/2000 | Matsuda |

Fig. 3

| Condition | Yellow Laser power | Yellow developer bias volts | Cyan Laser power | Cyan Developer bias volts | Magenta laser power | Magenta developer bias volts | Black laser power | Black developer bias volts |
|---|---|---|---|---|---|---|---|---|
| Z=1 | 37 | 420 | 37 | 400 | 37 | 380 | 30 | 350 |
| Z=2 | 44 | 460 | 44 | 440 | 44 | 420 | 33 | 380 |
| Z=3 | 51 | 500 | 51 | 480 | 51 | 460 | 36 | 410 |
| Z=4 | 58 | 540 | 58 | 520 | 58 | 500 | 39 | 420 |
| Z=5 | 65 | 580 | 65 | 560 | 65 | 540 | 42 | 450 |
| Z=6 | 72 | 620 | 72 | 600 | 72 | 580 | 58 | 480 |

METHOD OF SETTING LASER POWER AND DEVELOPER BIAS IN AN ELECTROPHOTOGRAPHIC MACHINE BASED ON AN ESTIMATED INTERMEDIATE BELT REFLECTIVITY

BACKGROUND OF THE INVENTION

1. Field of the Invention

The present invention relates to multi-color electrophotographic machines, and, more particularly, to setting laser power and developer bias in multi-color electrophotographic machines.

2. Description of the Related Art

Toner patch sensors are used in color printers and copiers to monitor and control the amount of toner laid down by the electrophotographic process. Toner patch sensors reflect light off of a toner patch to determine how much toner was laid down during the electrophotographic process. The sensor's voltage signal from reading a toner patch is compared to the sensor signal from reading a bare surface to produce either a voltage difference or a ratio between the two signals. In either case, when the reflectivity of the bare surface changes due to wear or toner filming, the accuracy of the toner patch sensor's estimates of toner mass per unit area or fused image density is compromised.

Toner patch sensors are used in printers and copiers to monitor the toner density of unfused images and provide a means of controlling the print darkness. In color printers and copiers, the toner patch sensors are used to maintain the color balance and in some cases to modify the gamma correction or halftone linearization as the electrophotographic process changes with the environment and aging effects. Conventional reflection based toner sensors use a single light source to illuminate a test patch of toner and one or more photosensitive devices to detect the reflected light.

The cyan, magenta, yellow and black color planes can be accumulated on an intermediate belt. A single reflective sensor can be used to sense the toner density of special test patches formed and transferred onto the intermediate belt. The reflection signal of the test patches is a function of both the toner density in $mg/cm^2$ and the reflectivity of the intermediate belt on which it rests. To properly interpret the reflection signals from the test patches, one must take into account the reflectivity of the intermediate belt. Unfortunately the reflectivity of the intermediate belt increases by 70–80% over life due to surface abrasion, toner filming, and the accumulation of toner fines and extra-particulates (fumed silica and titania). It is known to use a movable sensor in conjunction with a reference reflectivity surface that can be used to determine the reflectivity of the intermediate surface. However, this solution adds cost and complexity to the toner patch sensor.

What is needed in the art is an alternate method of estimating the reflectivity of the intermediate belt that does not increase the cost and complexity of the toner patch sensor hardware.

SUMMARY OF THE INVENTION

The present invention provides a method of estimating the reflectivity of an intermediate belt based on one or more of the following parameters: belt cycle count, pages printed, toner addition cycles, toner calibration count and pixel count for patch sensor location. The estimated belt reflectivity is then used to properly interpret the toner patch reflection signals.

The invention comprises, in one form thereof, a method of calibrating an electrophotographic machine having an image-bearing surface. A reflectivity of the image-bearing surface is estimated based upon an amount of usage of the electrophotographic machine. At least one electrophotographic condition is adjusted dependent upon the estimating step.

Test patches are formed at a variety of laser power and developer bias conditions, not just near the maximum possible values. Because high density black toner patches are about one-half as reflective as the belt, and the color toner patches are about eight times more reflective than the belt, the signal quality can be improved by using a much higher amplification for the black patches (8×) than for the color patches (1×).

An advantage of the present invention is that changes in the reflectivity of the intermediate transfer belt that occur with printer usage can be compensated for.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is a table of the conditions under which toner patches are measured.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
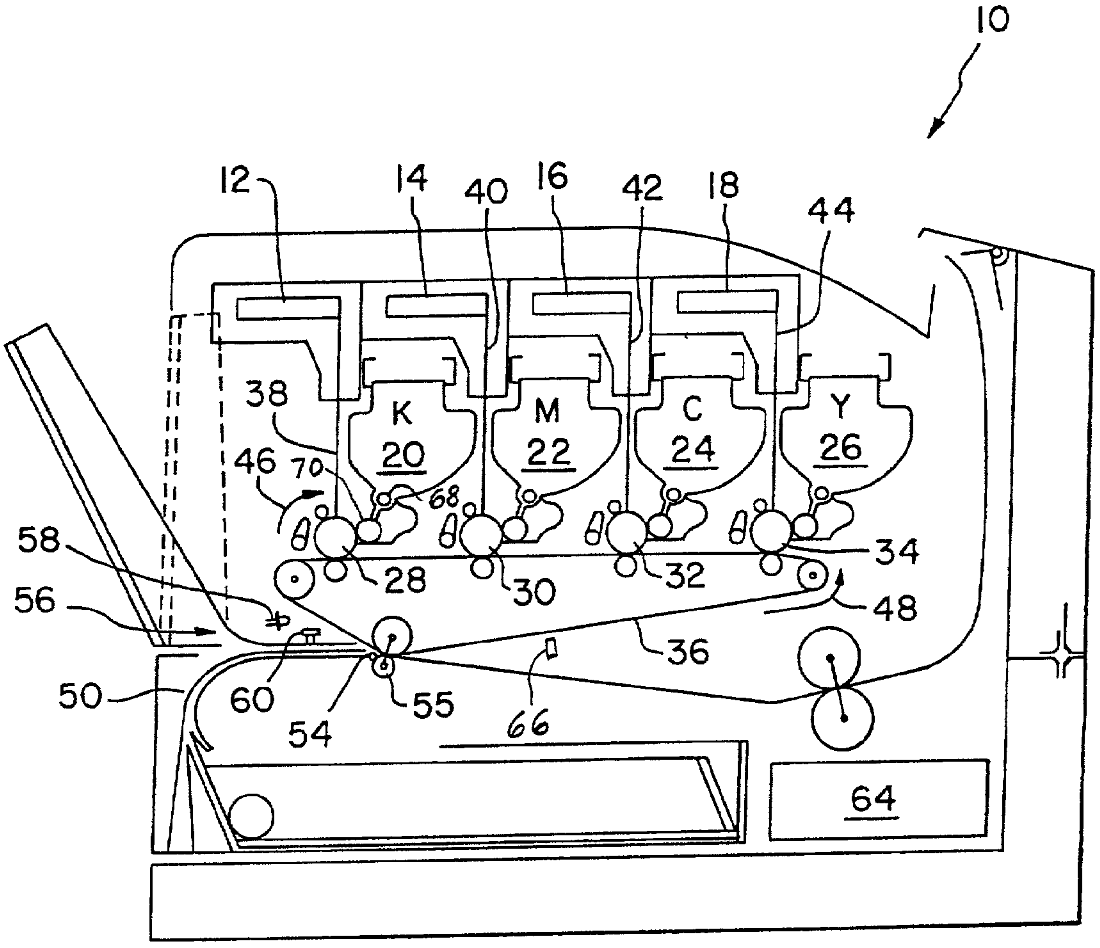
FIG. 1 is a side sectional view of a multicolor laser printer which can be used in conjunction with the method of the present invention.

Referring now to the drawings and, more particularly, to FIG. 1, there is shown one embodiment of a multicolor laser printer 10 including laser printheads 12, 14, 16, 18, a black toner cartridge 20, a magenta toner cartridge 22, a cyan toner cartridge 24, a yellow toner cartridge 26, photoconductive drums 28, 30, 32, 34, and an intermediate transfer member belt 36.

Each of laser printheads 12, 14, 16 and 18 scans a respective laser beam 38, 40, 42, 44 in a scan direction, perpendicular to the plane of FIG. 1, across a respective one of photoconductive drums 28, 30, 32 and 34. Each of photoconductive drums 28, 30, 32 and 34 is negatively charged to approximately −900 volts and is subsequently discharged to a level of approximately −200 volts in the areas of its peripheral surface that are impinged by a respective one of laser beams 38, 40, 42 and 44 to form a latent image thereon made up of a plurality of dots, or pels. The photoconductive drum discharge is limited to about −200 volts because the conductive core is biased at −200 volts to repel toner at the beginning of printing when the photoconductive surface touching the developer roll has not yet been charged to −900 volts by the charge roll. During each scan of a laser beam across a photoconductive drum, each of photoconductive drums 28, 30, 32 and 34 is continuously rotated, clockwise in the embodiment shown, in a process direction indicated by direction arrow 46. The scanning of laser beams 38, 40, 42 and 44 across the peripheral surfaces of the photoconductive drums is cyclically repeated, thereby discharging the areas of the peripheral surfaces on which the laser beams impinge.

The toner in each of toner cartridges 20, 22, 24 and 26 is negatively charged to approximately −600 volts. A thin layer of negatively charged toner is formed on the developer roll by means known to those skilled in the art. The developer roll is biased to approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −200 volts by the laser beams. As belt 36 rotates in the direction indicated by arrow 48, the toner from each of drums 28, 30, 32 and 34 is transferred to the outside surface of belt 36. As a print medium, such as paper, travels along path 50, the toner is transferred to the surface of the print medium in nip 54. Transfer to paper is accomplished by using a positively biased transfer roll 55 below the paper in nip 54.

Figure 2:
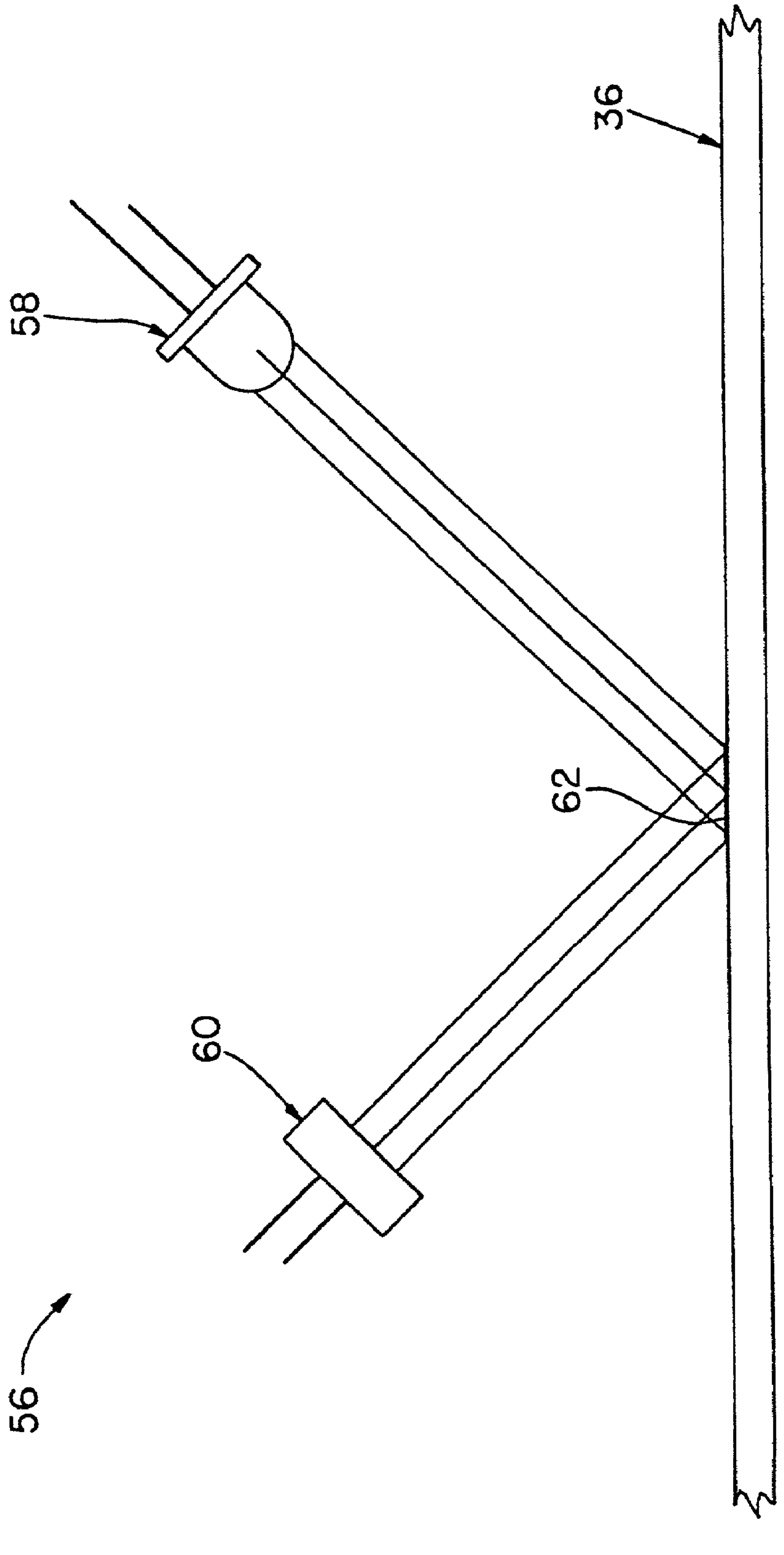
FIG. 2 is a schematic side view of the sensor arrangement of FIG. 1.

A sensor arrangement 56 includes a light source 58 and a light detector 60. Since belts are prone to warp and flutter as they move between rollers, sensor arrangement 56 can be located opposite a roller to stabilize the distance between sensor arrangement 56 and belt 36. Light source 58 illuminates a toner test patch 62 (FIG. 2) on intermediate belt 36. The light reflecting off of toner patch 62 is sensed by light detector 60.

Test patch 62 is formed by depositing a solid area patch of black, cyan, magenta, or yellow toner on intermediate belt 36. Cyan, magenta, and yellow toners are all fairly transparent at 880 nm, the wavelength used by toner patch sensor arrangement 56. Toner patch 62 is formed using near maximum laser power and developer bias settings so as to produce substantial toner densities on the magenta, cyan or yellow photoconductive drum. When patch 62 is to be read by patch sensor 56, the gain setting of toner patch sensor 56 is reduced by a factor of two from its normal color toner gain to avoid clipping. Otherwise, the signal level might exceed the dynamic range of the patch sensor circuitry. An engine controller 64 records and processes readings from sensor arrangement 56.

Experiments have shown that the reflectivity of intermediate belt 36 increases over life from about 3.3% to about 5–6%. The rate of increase and the long-term reflectivity value appears to depend on how much toner is transferred to belt 36. Locally heavy toner usage (like toner patch sensing) can produce visibly different reflective properties over the width of belt 36. The belt reflectivity at the patch sensor location can be modeled using an exponential form:

$$R=R_o e^{-x}+R_A(1-e^{-x})$$

where $R_o$ is the initial reflectivity and $R_A$ is the long-term asymptotic reflectivity value. The exponential coefficient, x, can be a function of toner usage and belt cycles. The dependence of x on toner usage and belt cycles can be described by building an empirical model of the belt reflectivity at the toner patch sensor wavelength. Under this model, the amount of toner passing under the patch sensor 56 can be estimated from one or more of the following parameters: page count, toner addition cycles, local pixel counting in the fast scan direction at the patch sensor position, and the number of toner patch sensor calibration cycles that have taken place. It may be necessary to track the toner usage on a per color basis, unless experiments show that all colors have the same impact on belt reflectivity values. The asymptotic reflectivity value may also be a function of the toner usage rates. Higher rates of toner usage may produce different reflectivity values in the long term than do lower rates of toner usage.

Once an empirical model has been constructed for a set of toners, the belt reflectivity can be predicted using the model. The calculations can be performed in the raster image processor within engine controller 64, but if the model is simple enough the engine processor within engine controller 64 would be able to handle it. Once the belt reflectivity has been "determined" using the model, the maximum or "saturated" reflection ratios can be calculated for each color of toner using measured values for the reflectivity of the toner. In the equation below, the non-linear response of toner patch sensor 56 is taken into account in calculating RR, the reflection ratio.

$$\text{Ratio of patch voltages: } RR_{saturated}=\frac{V_{patch}}{V_{bare}}=\frac{(axR_{toner}+bxR_{toner}^2)}{(axR_{belt}+bxR_{belt}^2)}$$

In this equation, $R_{toner}$ and $R_{belt}$, are the reflectivities of the bulk toner powder and intermediate belt 36, respectively. The saturated reflection ratio values are then used with the measured reflection ratios for the test patches to predict C.I.E. (Commission Internationale de l'Eclairage) L* values for black, magenta, and cyan test patches, and C.I.E. b* values for yellow test patches. The L* or b* can be calculated as a second order polynomial (empirically determined) of the quantity $$x=\frac{RR-1}{RR_{sat}-1}.$$

Test patches can be generated for a number of laser power and developer bias conditions and predicted L* and b* values can be computed for each test condition. By comparing the predicted L*and b* values to target values for solid area patches of each color, an electrophotographic operating point may be selected for each color toner cartridge 20, 22, 24, 26 which will give the desired image densities. The L* and b* values for halftone test patches can also be predicted using similar empirically determined equations. These values can then be used to linearize the halftone printing curve (sometimes referred to as making a gamma correction).

Toner patch sensor 56 is used to monitor and control how much toner is sent to the printed page. The laser power and developer bias operating conditions are selected to control solid area density. The halftone density response is measured for each color and this information is used to update the "gamma function" or "linearization correction." This procedure is sometimes referred to as a "density check" or "color calibration" or "color adjustment."

A density check can be initiated under the following conditions:

1) Printer 10 detects a new toner cartridge serial number at power-on;

2) Printer 10 detects a new toner cartridge serial number after covers are opened and closed;

3) Printer 10 detects a new belt 36 after power-on;

4) At power on, if the fuser temperature is below 60° C.;

5) Printer 10 has been in power-saver mode for over eight hours;

6) The user requests a density check through the front panel menus or through a connected host computer;

7) Printer 10 detects a transfer servo change greater than a predetermined number of volts since the last density check. Transfer servo values at the time of density check are stored in memory for future reference;

8) The incremental page count since the last density check is greater than 500 pages; or 9) The number of revolutions of belt 36 since the last density check is at least 200 revolutions.

Printer 10 performs the density check procedure in the following eleven steps:

1) Belt reflectivity is estimated using an empirical model based on belt cycles. The belt cycle count is updated every time that an optical sensor 66 detects another complete revolution of belt 36. Sensor 66 detects at least one mark (not shown) on belt 36 as the mark(s) passes by sensor 66. The equations used to estimate the reflectivity of belt 36 are:

$$R_{belt}=R_i e^{-k2x}+R_{max}(1-e^{-k2x}),$$

wherein $R_i$=initial reflectivity of belt 36

$R_{max}$=maximum reflectivity of belt 36

$R_{max}$=5 %+1.4%*$e^{-k1*belt\ cycle}$ x=Σbelt cycles*(1+2.37*area coverage)

k1=2.83E-04 k2=2.63E-04

"Area coverage" is a value selected by the user through the operator panel. Its default value is 0.15; a low value can be 0.05; and a high value can be 0.50.

2) Saturated reflection ratio values are estimated for each color of toner using the estimated belt reflectivity and experimentally determined values of the toner reflectivity. Since a reflection ratio is defined to be the ratio of the toner patch sensor signal voltages for a toner patch and a bare belt, the saturated reflection ratio is calculated using the following equation:

$$RRsat=\frac{V_{max}}{V_{bare}}=\frac{(axR_{max}+bxR_{max}^2)}{(axR_{belt}+bxR_{belt}^2)}$$

wherein Rmax is the measured bulk reflectivity of each toner powder when the incident light from light source 58 has a wavelength of 880 nm, and "a" and "b" are linear and quadratic coefficients that account for the observed response of the toner patch sensor to surfaces with known reflectivity values at 880 nm.

The following experimental constants are stored in printer memory:

Reflectivity of Yellow toner at 880 nm=$R_{max\_y}$

Reflectivity of Cyan toner at 880 nm=$R_{max\_hd\ c}$

Reflectivity of Magenta toner at 880 nm=$R_{max\_m}$

Reflectivity of Black toner at 880 nm=$R_{max\_k}$

3) A total of twenty-five solid area test patch locations are defined on the surface of belt 36. The patch lengths are chosen so that all of these patches can be sensed by sensor arrangement 56 during one revolution of belt 36. These patch locations are arranged in six groups of four patches (yellow, cyan, magenta and black) plus one bare reference patch. The purpose of the bare reference patch is explained in step 5 below. The measurement process begins by sensing the reflection signal amplitude for a clean belt at all twenty-five patch locations. During the next revolution of belt 36, toned patches are formed at a process speed of twenty pages per minute. The first group of test patches is formed using laser power and developer bias test values for condition 1, i.e., Z=1, in the table of FIG. 3. The remaining ones of the six groups of test patches are formed using conditions 2–6, respectively. In the table, laser power is expressed as a percentage of maximum laser power. The developer bias voltages are actually negative, with their magnitudes being shown in the table. The test patches are cleaned off the belt surface after passing toner patch sensor 56. The test patches are not transferred to paper.

As illustrated in the table, the laser power values and developer bias voltages are increased in uniform steps from one test condition to the next. Different colors may use different starting values and different step sizes for laser power and developer bias. Light source 58 illuminates each patch with light at 880 nm and senses the quantity of reflected light. The illumination is accomplished by pulsing light source 58, which can be a light emitting diode, for 100 microseconds every 3 milliseconds. Each light pulse occurs when printer controller 64 sends a transistor-transistor logic (TTL) signal to a circuit within controller 64 that drives light emitting diode 58. The reflected light from these pulses is detected by light detector 60, which can be a photodiode, and is amplified to produce a series of voltage pulses. Printer controller 64 samples the patch sensor output voltage approximately 70 microseconds after each pulse is initiated to give the detector circuit time to respond. Multiple pulse readings are taken for each patch and the signal values are averaged together to produce an average patch voltage. This process is used to produce patch readings for bare belt (toner free) patches and for solid area patches. The average voltage from each patch is compared to the corresponding bare belt voltage for the same location on the belt. The ratio of the two voltage signals is computed for each toner patch. In this manner, twenty-four reflection ratio (RR) values are obtained from the twenty-four solid area test patches.

4) The voltage of a charge roll 68 for black toner cartridge 20 is set to be 400 volts more negative than the bias of black developer roll 70 during this procedure and when a new black developer bias is chosen. The color cartridges 22, 24 and 26 for magenta, cyan and yellow, respectively, share a common high voltage source. Because of this, the charge roll bias for these colors is adjusted to be 400 volts more negative than the average of the highest and lowest color developer bias.

5) Because the light intensity of light source 58 decreases by approximately 10% in the first two minutes after light source 58 is energized, it is necessary to either wait several minutes for the light output intensity to stabilize, or to compensate for this intensity variation. One such compensation scheme includes sensing at least one additional toner patch location for every belt revolution (8.3 seconds per cycle). This belt location is always a bare patch location. A reflection ratio is measured for this bare "reference" patch. To compensate for the warm-up effect of light source 58, the toned patch reflection ratios are divided by the reflection ratio of this reference patch. If more than one reference patch is used, the toner reflection ratios are then divided by the average reflection ratio of the bare reference patches.

6) Electrophotographic operating conditions are selected using the twenty-four measured reflection ratios described above. The six reflection ratios for the black test patches are used to predict L* (darkness) values that the black test patches would have produced if they had been printed to paper and fused. The L* value of each black test patch is computed as follows:

$$L^*_{black} = ax + bx^2 + cx^3 + 100.0. \text{ where } x = \frac{RR - 1}{RR_{sat} - 1},$$

and the four parameter values in the equation are empirically determined. The reflection ratios for the cyan and magenta test patches are converted to L* values in a similar manner. The yellow reflection ratios are converted into b* (C.I.E. L*a*b*units) values:

$$b^*_{yellow} = ax + bx^2 + cx^3 - 10.0$$

As is evident from these equations, the L* and b* values for paper having no toner on it are 100.0 and −10.0, respectively.

7) The predicted color values of the test patches for cyan, magenta and yellow are fit to second order polynomial functions of Z, the "test condition index", to smooth out any noise in the data. The second order functions are then evaluated to determine what Z value would produce a match between the target color value and the fitted function. The resulting test condition value may be an intermediate value, such as 3.57, between test conditions 3 and 4. This result would cause the new laser power and developer bias values to be:

$$Lpow = Lpow_1 + (3.57 - 1) \times Lpow\_step$$

$$Devbias = Devbias_1 + (3.57 - 1) \times Devbias\_step$$

where $Lpow_1$ is the initial laser power and Lpow_step is the amount by which laser power is incremented for each successive test condition. Similarly, $Devbias_1$ is the initial developer bias expressed in volts and Devbias_step is the amount by which developer bias is incremented for each successive test condition.

Each color has a target L* or b* value stored in the printer memory. These values may be increased or decreased by several units from the nominal values through the front panel of printer 10 while printer 10 is in a selected mode.

8) The predicted L* values for the six black patches are fit to an exponential function $L^* = Ae^{-Bx} + C$, using standard least squares fitting procedures. The predicted L* values for the earlier test conditions are given more weight in the fitting process to avoid potential problems with black toner patches becoming saturated at the later test conditions. The fitted exponential function is then used to extrapolate or otherwise calculate a desired test condition between 6 and 12 that is intended to produce the desired target L* value for black.

9) Printer 10 sets the laser power and developer bias to the new operating conditions and prints a series of forty-eight test patches in four colors, with twelve halftone patterns per color. The twelve halftone patterns each have a different percentage of area that is filled with toner. For example, the halftone patterns can include fill levels of 2%, 4%, 6%, 8%, 10%, 15%, 25%, 40%, 55%, 70%, 85% and 100%. The screens used for each color are the uncorrected 600 dots per inch (dpi)/20 pages per minute (ppm) screens. These patterns are printed to belt 36 in a single belt revolution with the test patches grouped together by halftone values. The yellow halftones are interleaved with the cyan, magenta and black halftones. These halftone test patches are sensed with toner patch sensor 56 and reflection ratios are computed for each patch. The reflection ratios are all converted into L* or b* values using unique conversion coefficients for each test patch. These L* and b* values are then used to correct or linearize the halftone printing curve for the 20 ppm process mode.

10) The process speed is reduced to 10 ppm and the engine enters into 1200 dpi mode. In this mode, laser printheads 12, 14, 16, 18 divide each pel into fewer slices and change the number of slices that the laser diode is on during each pel. The laser power for this mode is derived from the laser power selected for 20 ppm printing. The relationship between the laser powers for the two modes may include a linear scaling factor and a constant offset. The developer bias at 10 ppm may follow a similar linear transformation from the 20 ppm value.

After the print engine has switched to the new 10 ppm laser and developer bias conditions, the halftone series is again printed to belt 36, but this time the halftone screens used are those associated with 10 ppm (1200 dpi) printing. The forty-eight halftone patches are read by patch sensor 56, reflection ratios are obtained, and L* or b* values are estimated for each test patch. These values are then used to correct or linearize the 1200 dpi halftone printing curve.

11) The calibration information (laser power, developer bias, and linearization) is stored in memory and used to print new customer images until the next calibration cycle.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of calibrating an electrophotographic machine having an image-bearing surface, wherein the electrophotographic machine comprises a multi-color electrophotographic machine, said method comprising the steps of:

estimating a reflectivity of the image-bearing surface based upon an amount of usage of the electrophotographic machine;

determining a reflectivity of at least one color toner on said image bearing surface, wherein said determining includes:

depositing a plurality of toner patches of each of a plurality of colors on the image-bearing surface;

emitting light onto said toner patches;

measuring an amount of light that is reflected off of each of said toner patches;

emitting light onto a bare section of the image-bearing surface, the bare section having substantially no toner thereon; and measuring an amount of light that is reflected off of the bare section, said adjusting being dependent upon said estimating step, and adjusting at least one electrophotographic condition, said adjusting being dependent upon said estimating step and upon said determining step, wherein said adjusting includes the substeps of:

calculating a respective reflection ratio for each of said toner patches dependent upon each of said measuring steps; and converting each of said reflection ratios into a respective predicted lightness value.

2. The method of claim 1 wherein said amount of usage comprises at least one of a number of revolutions of the image-bearing surface, a number of pages output by the electrophotographic machine, a number of times that toner has been added to the electrophotographic machine, an amount of toner usage, and a number of pixels produced by the electrophotographic machine.

3. The method of claim 1 wherein said adjusting step is dependent upon each of said measuring steps.

4. The method of claim 1 wherein the plurality of colors include cyan, magenta and yellow.

5. The method of claim 1 wherein each of said emitting and measuring steps are performed with a toner patch sensor.

6. The method of claim 1 wherein said adjusting step is performed independently for each of the colors of the multi-color electrophotographic machine.

7. The method of claim 6, wherein said adjusting step is performed by calculating a saturation reflection ratio for each of the colors of the multi-color electrophotographic machine.

8. The method of claim 1 wherein said toner patches comprise solid area toner patches.

9. The method of claim 1 wherein said plurality of toner patches are formed under various electrophotographic conditions.

10. The method of claim 1, wherein each said reflection ratio comprises a ratio between the amount of light that is reflected off of a respective said toner patch and the amount of light that is reflected off of the bare section.

11. The method of claim 1, comprising the further steps of:

fitting said predicted lightness values to an exponential function; and using said exponential function to ascertain at least one of a desired laser power and a desired developer bias needed to achieve a desired lightness value.

12. The method of claim 1, comprising a further step of converting yellow reflection ratios into C.I.E. b* values.

13. The method of claim 1, wherein each of said predicted lightness values comprises a lightness value expected if a corresponding said toner patch were to be transferred to paper and fused.

14. A method of calibrating an electrophotographic machine having an image-bearing surface, said method comprising the steps of creating a plurality of toner patches on the image-bearing surface, each said toner patch being created with at least one of a different test laser power value and a different test developer bias value;

emitting light onto said toner patches;

measuring an amount of light that is reflected off of each of said toner patches;

emitting light onto a bare section of the image-bearing surface, the bare section having substantially no toner thereon;

measuring an amount of light that is reflected off of the bare section;

estimating a reflectivity of the image-bearing surface based upon an amount of usage of the electrophotographic machine; and determining at least one of a desired laser power value and a desired developer bias value, said determining being dependent upon said estimating step and each of said measuring steps.

15. The method of claim 14, wherein said determining step includes the substeps of:

calculating a respective reflection ratio for each of said toner patches dependent upon each of said measuring steps;

converting each of said reflection ratios into a predicted lightness value; and ascertaining at least one of a desired laser power and a desired developer bias needed to achieve a desired lightness value, said ascertaining being dependent upon said predicted lightness values and at least one of said test laser power values and said test developer bias values.

16. The method of claim 15, wherein said ascertaining step includes:

fitting said predicted lightness values and at least one of said test laser power values and said test developer bias values to an exponential function; and using said exponential function to calculate said at least one of a desired laser power and a desired developer bias needed to achieve said desired lightness value.

17. The method of claim 15, wherein said reflection ratios comprise ratios between the amounts of light that are reflected off of said toner patches and the amount of light that is reflected off of the bare section.

18. The method of claim 15, wherein each of said predicted lightness values comprises a lightness value expected if a corresponding said toner patch were to be transferred to paper and fused.

19. A method of calibrating a multi-color electrophotographic machine having an image-bearing surface, said method comprising the steps of:

forming a plurality of cyan solid area toner patches on the image-bearing surface, each said cyan toner patch being formed under a respective one of a plurality of electrophotographic conditions;

forming a plurality of magenta solid area toner patches on the image-bearing surface, each said magenta toner patch being formed under a respective one of said plurality of electrophotographic conditions;

forming a plurality of yellow solid area toner patches on the image-bearing surface, each said yellow toner patch being formed under a respective one of said plurality of electrophotographic conditions;

emitting light onto each of said toner patches;

measuring an amount of light that is reflected off of each of said toner patches;

emitting light onto a bare section of the image-bearing surface, the bare section having substantially no toner thereon;

measuring an amount of light that is reflected off of the bare section;

estimating a reflectivity of the image-bearing surface based upon an amount of usage of the electrophotographic machine; and adjusting at least one of a laser power and a developer bias dependent upon said estimating step and each of said measuring steps.

20. The method of claim 19, wherein said plurality of electrophotographic conditions comprise at least one of a plurality of laser power values and a plurality of developer bias values.

* * * * *